United States Patent
Maeng (10) Patent No.: US 9,372,859 B1
(45) Date of Patent: Jun. 21, 2016

(54) METHODS, DEVICES, AND MEDIUMS FOR DISPLAYING INFORMATION HAVING DIFFERENT FORMATS

(75) Inventor: Joon Maeng, Newcastle, WA (US)

(73) Assignee: INTELLECTUAL VENTURES FUND 79 LLC, Las Vegas, NV (US)

(*) Notice: Subject to any disclaimer, the term of this patent is extended or adjusted under 35 U.S.C. 154(b) by 755 days.

(21) Appl. No.: 13/331,684

(22) Filed: Dec. 20, 2011

(51) Int. Cl.
G06F 17/00 (2006.01)
G06F 17/30 (2006.01)
G06F 17/21 (2006.01)
G06F 17/22 (2006.01)

(52) U.S. Cl.
CPC ........ *G06F 17/30017* (2013.01); *G06F 17/211* (2013.01); *G06F 17/30011* (2013.01); *G06F 17/30056* (2013.01); *G06F 17/2235* (2013.01)

(58) Field of Classification Search
CPC .......... G06F 17/211–17/212; G06F 17/30011; G06F 17/30017; G06F 17/30056
USPC .......................................... 715/205, 243, 248
See application file for complete search history.

(56) References Cited

U.S. PATENT DOCUMENTS

| | | | |
|---|---|---|---|
| 5,623,679 A * | 4/1997 | Rivette | G06F 13/4063 715/255 |
| 7,496,829 B2 * | 2/2009 | Rubin et al. | 715/203 |
| 2006/0075348 A1 * | 4/2006 | Xu et al. | 715/730 |
| 2008/0229180 A1 * | 9/2008 | Bhatt et al. | 715/202 |
| 2009/0144620 A1 * | 6/2009 | Bauchot et al. | 715/277 |
| 2009/0204646 A1 * | 8/2009 | Park | G06F 17/30126 |
| 2011/0202825 A1 * | 8/2011 | Volsky | 715/230 |
| 2012/0265759 A1 * | 10/2012 | Bergeron et al. | 707/740 |

OTHER PUBLICATIONS

Heidi Steele, "Managing Word Documents", Dec. 12, 2003, Pearson—InformIT, pp. 4.*

* cited by examiner

*Primary Examiner* — Chau Nguyen
(74) *Attorney, Agent, or Firm* — Schwabe, Williamson & Wyatt (57) ABSTRACT

A first document may be identified, wherein the first document may be created in a first file format. A second document may be identified, wherein the second document may be created in a second file format. A page of the first document may be linked with a page of the second document. The page of the first document may be stored with the page of the second document in a file. The page of the first document may be displayed. An input may be received selecting the page of the second document and the page of the second document may be displayed in response to the input.

56 Claims, 8 Drawing Sheets

METHODS, DEVICES, AND MEDIUMS FOR DISPLAYING INFORMATION HAVING DIFFERENT FORMATS

BACKGROUND

Documents may have different formats. For example, a known slide presentation application may create slides formatted primarily for illustrations and diagrams with only a few lines of text. A known word processing application may generate documents formatted primarily for text, some figures, and some tables.

A user may need to maintain two different files in two different formats for related content. For example, the user may create a first document in a slide presentation format using the known slide presentation application and may create a second document in a text format using the known word processing application. The first document may be used for making presentations on a particular subject and the second document may contain additional details related to the particular subject.

The user may need to display different pages from the two different documents. For example, the user may use the known slide presentation application during a presentation to open and display pages from the first document. During the presentation, the user may need to refer to more detailed information contained in the second document. The user may need to launch the known word processing application, open the second document, and locate and display a particular page in the second document. Switching between different application programs, opening different files, and searching for different pages in the different files may be awkward and cumbersome.

DETAILED DESCRIPTION

Different document editing applications may be designed for creating and displaying different types of information. For example, a slide presentation application may be well suited for creating and displaying text and drawings for slide presentations. A word processing application may be better suited for creating and displaying more detailed text information.

Documents produced from the different document editing applications may be needed at the same time. For example, presentation slides created by the slide presentation application may be displayed during a presentation. However, a text document created by the word processing application also may need to be displayed during the presentation. Launching the word processing application, opening the file that contains the text document, and locating and displaying the appropriate page from the text document may be inconvenient.

In an example of the present disclosure, a computer system may link pages from documents having different formats. A same application program may be used to view the linked pages without launching other application programs.

Figure 1:
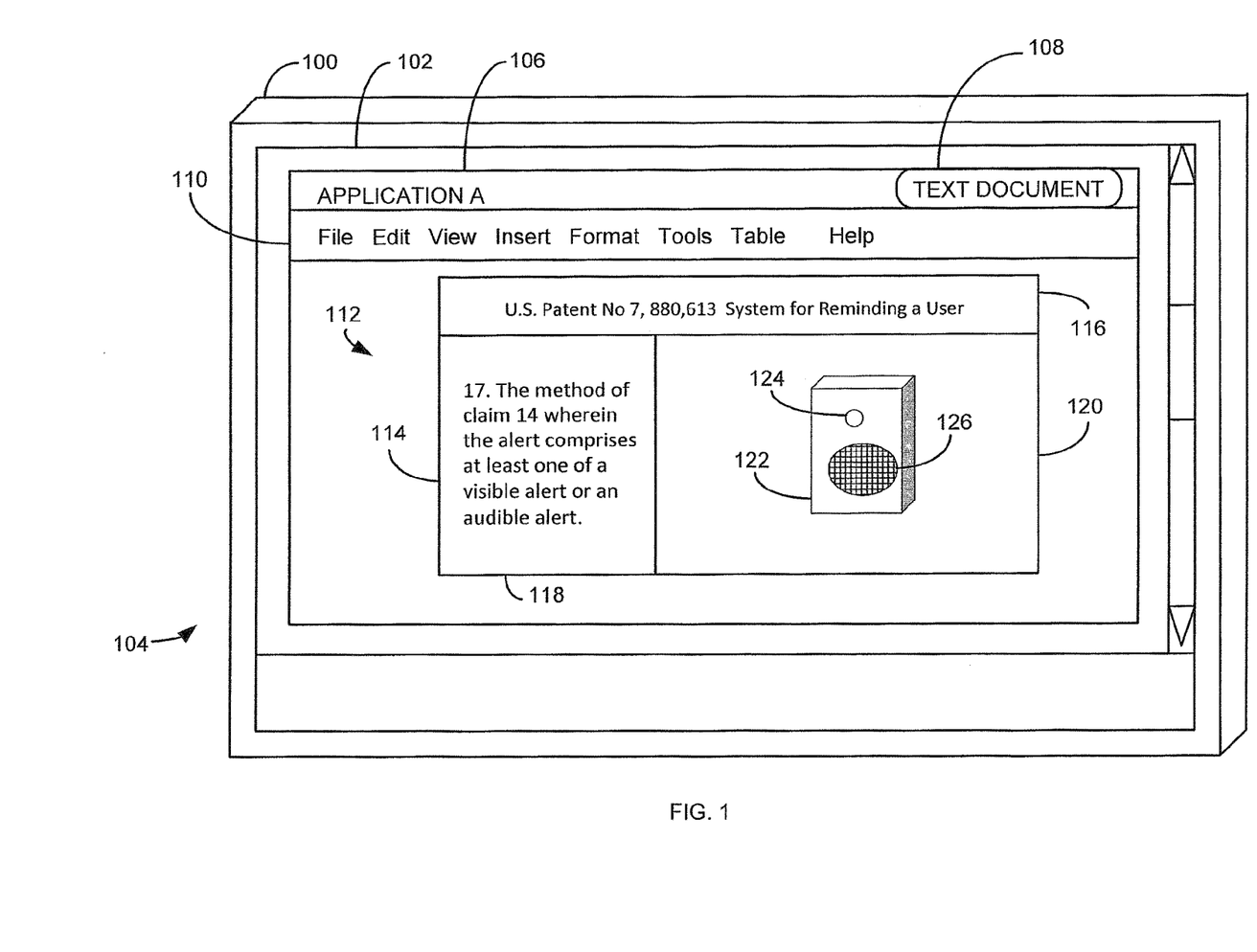
FIG. 1 depicts an example of a computer system configured to display a document in a first format.

FIG. 1 depicts an example of a computer system 100 configured to display a document 112 having a first format. Computer system 100 may comprise a personal computer, a laptop computer, a tablet computer, a hand-held device, an industrial automation system, a medical device, a household appliance, an entertainment device, a media player, e.g., an MP3 player, a smart telephone, a personal digital assistant (PDA), a gaming device, a television, an overhead projector system, or the like, or any combination thereof. A graphical user interface (GUI) 102 may comprise one or more computer screens, touch screens, projector screens, video screens, overhead screens, or the like, or any combination thereof, configured to display information.

A software application program 104 may operate in computer system 100 and may display an electronic application window 106 within GUI 102. Software application program 104 may display a tool bar 110 within electrical application window 108 for creating, editing, and displaying an electronic page 114 of an electronic document 112. Software application program 104 may be any software application that creates, edits, and/or displays documents or any other information. For example, software application program 104 may be a word processing application, a slide presentation application, a spreadsheet application, a computer aided design (CAD) application, a drawing editor application, a web application, an image display application, an audio application, a video application, or the like, or any combination thereof.

For explanation purposes, software application program 104 may be referred to as application 104, electronic application window 106 may be referred to as application window 106, electronic document 112 may be referred to as document 112, and electronic page 114 may be referred to as page 114.

In one example, application 104 may be a slide presentation application, document 112 may be a slide presentation document, and page 114 may be a presentation slide. Page 114 may include a title section 116, a text section 118, and a display section 120 for displaying a diagram 122. In one example, diagram 122 may be a notification device comprising both a visible alert 124 and an audible alert 126.

While displaying page 114, the user may need to show additional information related to diagram 122. For example, a page in a text document may provide an additional detailed description of visible alert 124 and audible alert 126. The page from the text document may have previously been linked to page 114. Application 104 may display an icon 108 within application window 106 associated with the linked page from the text document. Application 104 may display the linked page from the text document in response to selection of icon 108. Displaying the linked page from the text document in response to selection of icon 108 may prevent the user from having to manually launch the word processing application, open the text document, and locate a relevant page from the text document.

Application 104 may display other icons in application window 106. For example, multiple pages from the text document may be linked to page 114. A second icon associated with a second page of the text document may be displayed in application window 106. In another example, another page having another format may be linked to page 114. For example, a page from a spreadsheet document or a page from a computer aided design (CAD) document may be linked to page 114. An icon associated with the linked page from the spreadsheet document or CAD document may be displayed in application window 106.

Figure 2:
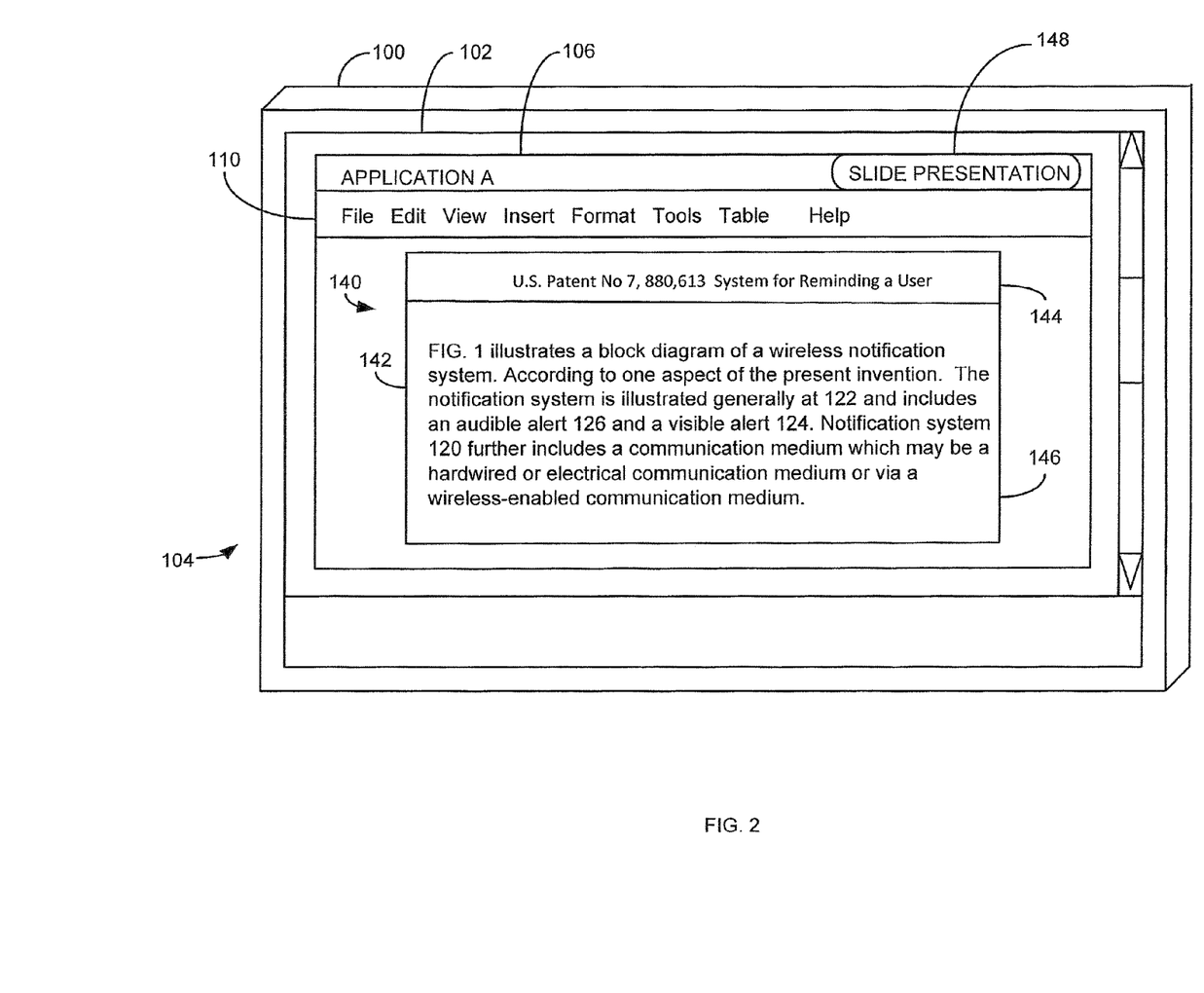
FIG. 2 depicts an example of a computer system configured to display a document in a second format.

FIG. 2 depicts an example of a computer system configured to display a document having a second format. In response to keystroke entries or selection of an icon, application 104 may display a page 142 of a document 140. Page 142 may have been previously linked to a page previously displayed in application window 106. For example, page 142 may have previously been linked to page 114 in FIG. 1. Document 140 may have a different format than the page previously displayed in application window 106. For example, the previously displayed document may have been created using a slide presentation application and document 140 may have been created using a word processing application.

Page 140 may comprise a title section 144 containing a name of document 140 and a text section 146. Text section 146 may include any information, such as, text, diagrams, tables, or the like, or any combination thereof. In one example, text section 146 may contain text describing in more detail a diagram in the page previously displayed in application window 106.

Application 104 may switch from displaying a page having a first format to displaying page 142 having a second format in response to entry of one or more keystrokes, selection of an icon, or the like, or any combination thereof. Application 104 may display page 142 without the user having to manually launch a software application used for creating document 140, locate document 140 in a directory, open document 140, and/or locate page 142 within document 140. Therefore, documents having different formats may be displayed faster and with less disruption.

After displaying page 142, the user may want to switch back to the previously displayed page having the first format. For example, the user may want to switch back to displaying page 114 in FIG. 1. Application 104 may display an icon 148 associated with the previously displayed page and display the previously displayed page in response to entry of keystrokes or selection of icon 148.

Figure 3:
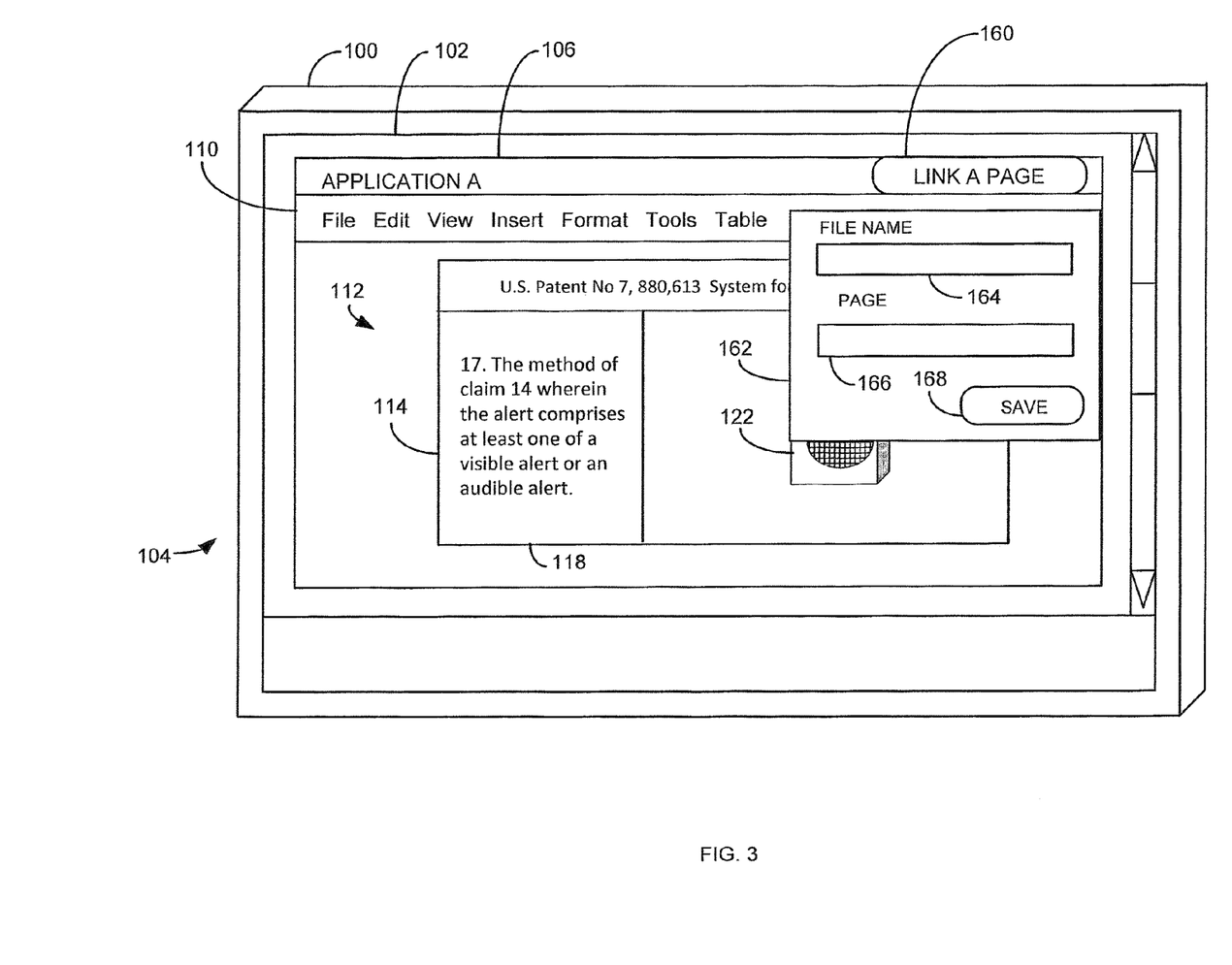
FIG. 3 depicts an example of a computer system configured to link documents having different formats.

FIG. 3 depicts an example of a computer system 100 configured to link documents having different formats. The user may launch application 104. Application 104 may open document 112 from a previously created file or may create and save document 112 as a new file. Page 114 may have been previously created in document 112 or may be created after launching application 104.

A user may link currently displayed page 114 to a second page. The second page may be from document 112 or may be from a different document. The second page may be in a same format as page 114 or may be in a different format. For example, page 114 may be a presentation slide created from a slide presentation application and the second page may be from a text document created with a word processing application. In another example, page 114 and/or the second page may be created from a spreadsheet application, a drawing editor application, an image display application, an audio presentation application, a video presentation application, a web application, or the like or any combination thereof.

Application 104 may display an icon 160 in application window 106 for linking to the second page. Responsive to selection of icon 160, application 104 may display a window 162. Electronic window 162 may display a file field 164, a page field 166, and a save icon 168. In another example, the user may launch electronic window 162 by selecting tabs in tool bar 110 or entering keystrokes.

The user may enter a file name into file field 164 and enter a page number or page name into page field 166. For example, the user may enter a file name for a file containing a text document previously created by a word processing application. The text document may be in a different format than document 112 and the page number or page name entered into page field 166 may be one of the pages in the text document. Application 104 may link the page identified in page field 166 with page 114 in response to selection of save icon 168 and may save the page in a same file containing document 112.

In another example, application 104 may display a directory structure within electronic window 162 and display files names for files contained within the directory structure. The file names may be associated with documents having a same format or documents having different formats. The user may select any of the displayed file names and application 104 may display the pages of the document associated with the selected file name in electronic window 162. The user may select any of the displayed pages and select save icon 168. Application 104 may link the selected pages to page 114 and may store the selected pages in the file containing document 112.

In another example, application 104 may open a second file associated with the file name selected in file field 164. The user may view pages of a second document contained in the second file and select one of the pages for linking to page 114. In another example, application 104 may launch a second application used for creating the second file associated with the file name entered into file field 164. The user may create, edit, and/or view a page of the second document with the second application. In response to selection of save icon 168, application 104 then may link the page of the second document to page 114 and save the page in the file containing document 112.

After linking, the second page may be displayed directly from application 104. For example, application 104 may display page 114 and display another icon in application window 106 associated with the second page. In response to selection of the other icon, application 104 may switch from displaying page 114 to displaying the second page.

Figure 4:
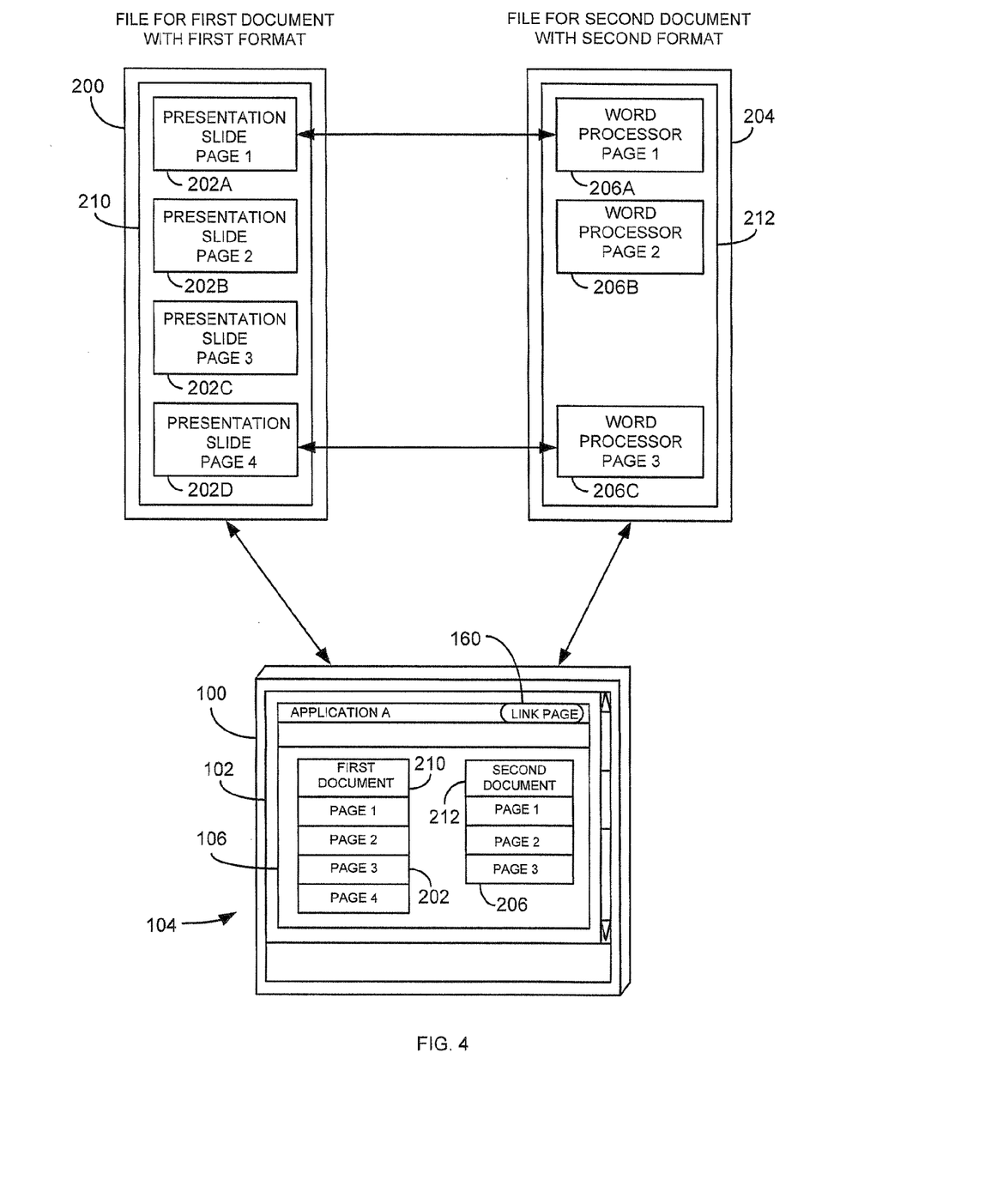
FIG. 4 depicts an example of a computer system configured to store documents having different formats.

FIG. 4 depicts an example of a computer system configured to store documents having different formats. A first file 200 may contain a document 210 comprising pages 202A-202D. A second file 204 may contain a document 212 comprising pages 206A-206C. File 200 and file 204 may be stored in memory within computer system 100. In another example, files 200 and 204 may be stored on a remote network server and accessed by computer system 100 via a network.

Application 104 may open document 210 and display any of pages 202A-202D within application window 106. In another example, application 104 may display a list of pages 202 in application window 106 without opening document 210 or without opening individual pages 202. The user may select one of pages 202 by opening the page in application window 106 or selecting one of pages 202 from the list. In one example, the user may open and/or select page 202A.

Application 104 may open and display document 212. For example, application 104 may display a file directory in response to selection of icon 160. The user may navigate through the file directory and select file 204. In one example, application 104 may open document 212 in response to selection of file 204 and display one of pages 206. In another example, application 104 may display a list of pages 206 without opening document 212.

The user may link one of pages 206 in document 212 to previously selected page 202A in document 210. For example, the user may select a save icon after opening page 206A in application window 106. Computer system 100 may link page 206A to page 202A and store page 206A in file 200 in response to selection of the save icon.

The user may display another page from document 210. For example, after selecting and linking page 206A with page 202A, the user may close document 212 and redisplay document 210. The user may select another page 202D from document 210. The user then may redisplay document 212 in application window 106 and select any of pages 206 for linking to page 202D. In this example, the user may select page 206C in document 212 for linking to page 202D in document 210.

Computer system 100 may electronically link page 206C to page 202D and store page 206C in file 200 in response to selection of the save icon. In another example, the user may simply select pages 202D and 206C from lists displayed within application window 106 without opening documents 210 or 212.

Pages may be linked from any combination of different documents. For example, pages in a spreadsheet document may be linked with pages in a slide presentation document. In another example, pages in a text document may be linked with pages in a video clip document.

In yet another example, pages in a same format may be linked together. For example, a slide presentation application may link a first presentation slide with a second presentation slide. The second presentation slide may be used as a backup slide during presentations. In one example, the first presentation slide and the second presentation slide may be in the same slide presentation document. In another example, the first presentation slide and the second presentation slide may be in different slide presentation documents.

Application 104 also may create and/or edit documents in different file formats. For example, a user may launch application 104 and create pages 202A-202D of document 210. The user may select an icon or enter keystrokes that cause application 104 to launch a second application associated with a second file format. The user may use the second application to create and/or edit pages 206A-206C.

For example, the user may use a slide presentation application to create page 202A. After creating page 202A, the user may cause slide presentation application to launch a word processing application and use the word processing application to create page 206A. The user may select icon 160 or enter keystrokes that cause application 104 to link page 206A with page 202A, store page 206A into file 200, and/or switch back to displaying page 202A. In this example, application 104 may operate as both a slide presentation application for creating, editing, and displaying pages 202A-202D and operate as a word processing application for creating, editing, and/or displaying pages 206A-206C.

Application 104 may link pages 206 to pages 202 and store pages 206 in file 200 in any manner. For example, pages 206 may be converted into an image format, such as a Portable File Format (PDF). The page in the image format may be embedded into pages 202, hyper-linked to pages 202, addressed to pages 202, or the like, or any combination thereof. In another example, meta-data may be added to pages 202 addressing selected pages 206.

Pages 206 also may be stored in file 200 in an editable format. For example, in response to selection of linked page 206A, application 104 may launch the application previously used for creating document 212 and open page 206A. Page 206A then may be edited and stored in file 200.

Figure 5:
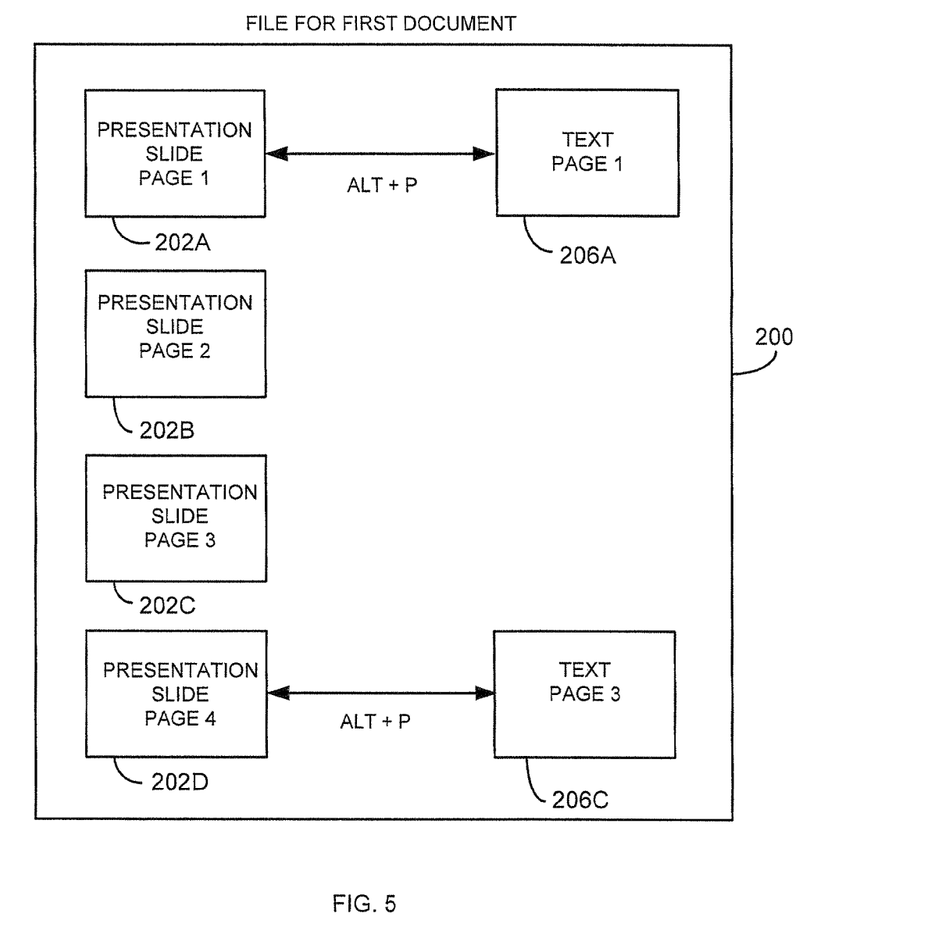
FIG. 5 depicts an example of a file containing documents having different formats.

FIG. 5 depicts an example of a file containing documents in different formats. File 200 may contain a set of pages 202A-202D created by a first application in a first format. For example, pages 202A-202D may be presentation slides created with a slide presentation application. Pages 206A and 206B may have been created by a second application in a second file format. For example, pages 206A and 206C may be pages of text created with a word processing application. Page 206A may have been linked to page 202A and stored in file 200 and page 206C may have been linked to page 202D and stored in file 200.

The application used for creating pages 202A-202D may open file 200 and display page 202A. The application may switch from displaying page 202A to displaying page 206A in response to selection of an icon displayed in the application window or in response to selection of keystrokes, such as ALT+P. The application may do nothing when no pages are linked to the currently displayed page. For example, the keystrokes ALT+P may be entered while displaying page 202B. The application may continue to display page 202B since no pages are linked to page 202B.

In another example, the application may create a split screen in the application window and display both linked pages. For example, page 202D may be displayed in a first half of the application window and page 206C may be displayed in a second half of the application window.

Figure 6:
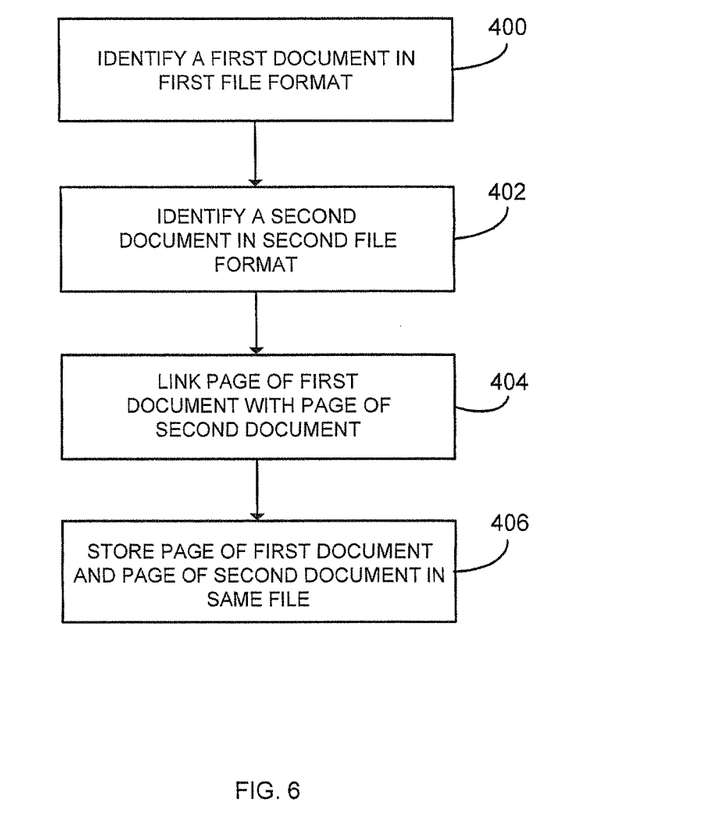
FIG. 6 depicts an example of a process for linking documents having different formats.

FIG. 6 depicts an example of a process for linking documents in different formats. In operation 400, an application may identify a first document created in a first format. For example, the first document may comprise presentation slides created by a slide presentation application. In operation 402, a second document in a second file format may be identified. For example, the second document may comprise text pages created by a word processing application.

In operation 404, a page of the first document may be linked with a page of the second document. For example, the application may display the page of the first document while detecting selection of a page of the second document. The application may link the page of the first document with the page of the second document in response to the selection. For example, the application may add meta-data to the page of the first document comprising a link or an address to the page of the second document.

In operation 406, the page of the first document and the page of the second document may be stored in a same file. For example, the page selected from the second document may be stored in the file containing the first document. In another example, the page of the second document may be saved in a different file.

Figure 7:
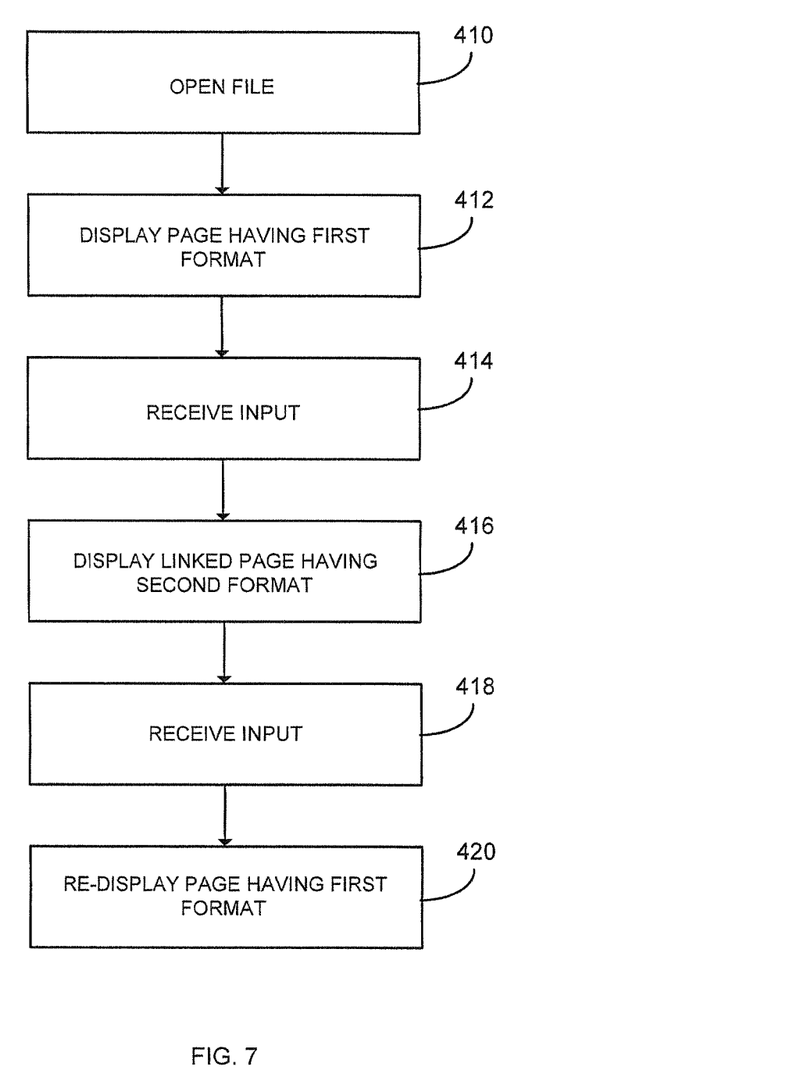
FIG. 7 depicts an example of a process for displaying documents having different formats.

FIG. 7 depicts an example of a process for displaying documents having different file formats. In operation 410, an application may open a file containing a document in a first format. The file also may contain pages in a second format linked to pages in the document. The application originally used for creating the document may be used for opening the file.

In operation 412, the application may display a page of the document. For example, a user may navigate to a particular presentation slide during a presentation. In operation 414, the application may receive an input requesting display of a linked page in the second format. For example, the user may want to display a page created from a word processing application containing text describing a diagram in the currently displayed presentation slide. The user may enter keystrokes or select an icon directing the application to display the linked page. In operation 416, the application may display the linked page in response to the input. For example, the application may switch from displaying the presentation slide to displaying the text page created by the word processing application without launching the word processing application.

In operation 418, the application may receive a request to switch back to the previously displayed page. For example, the user may want to redisplay the diagram in the presentation slide. The user may enter other keystrokes or select another icon directing the application to redisplay the presentation slide. In operation 420, the application may redisplay the presentation slide in response to the input.

Figure 8:
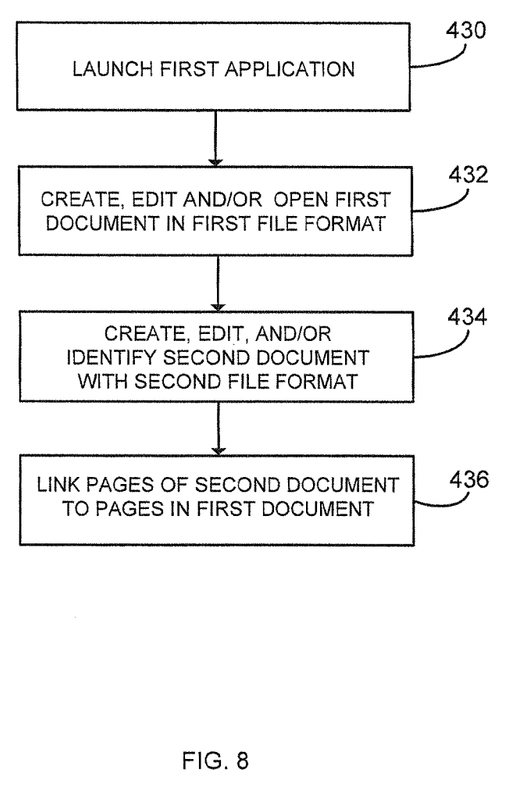
FIG. 8 depicts an example of a process for creating and linking documents having different formats.

FIG. 8 depicts an example of a process for creating and linking documents in different formats. In operation 430, a first application may be launched to create, edit and/or open a first document having a first format. For example, a spreadsheet application may be launched to create spreadsheets for company financial information. In operation 432, the first document may be created, edited, and/or opened. For example, different spreadsheet pages may be created by the spreadsheet application.

In operation 434, a second document in a second format may be created, edited, and/or identified. For example, a user may launch a drawing editor application from the spreadsheet application and create, edit, and/or select a drawing page. In operation 436, pages from the second document may be linked to pages in the first document. For example, the spreadsheet application may link a drawing page created by the drawing editor application to one of the spreadsheet pages created by the spreadsheet application.

The spreadsheet document may be opened and the spreadsheet pages displayed. The spreadsheet application may display the linked drawing page in response to a user input without launching the drawing editor application.

The system and apparatus described above may use dedicated processor systems, micro-controllers, programmable logic devices, microprocessors, or the like, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise a storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. Claim is made to all modifications and variations coming within the spirit and scope of the following claims.

The invention claimed is:

1. A method, comprising:
   launching a first application configured to generate a first document;
   displaying, through the first application, a first page of the first document;
   displaying, through the first application, a second document generated from a second application different than the first application;
   selecting, through the first application, a second page of the second document;
   retrieving, through the first application, the second page of the second document in response to selecting the second page of the second document;
   receiving, through the first application while displaying the first page of the first document, an input requesting display of the second page of the second document;
   switching, through the first application, from displaying the first page of the first document to displaying the second page of the second document in response to the input;
   displaying a save icon while displaying the second page of the second document; and
   saving the second page of the second document in the first document in response to selection of the save icon.

2. The method of claim 1, further comprising displaying, by the first application, an icon in the first document in response to storing the second page of the second document, wherein the input requesting display of the second page of the second document comprises a selection of the icon.

3. The method of claim 2, further comprising switching, through the first application, from displaying the second page of the second document to displaying the first page of the first document in response to an additional input.

4. The method of claim 1, wherein the input comprises a keyboard entry.

5. The method of claim 1, further comprising:
opening, through the first application, a display window; and
opening, through the first application, the first document in the display window.

6. The method of claim 5, further comprising:
displaying, through the first application, an icon for the second page of the second document in the display window; and
switching, through the first application, from displaying the first page of the first document in the display window to displaying the second page of the second document in the display window in response to detecting selection of the icon for the second page of the second document.

7. The method of claim 6, further comprising:
displaying, through the first application, an icon for the first page of the first document in the display window; and
switching, through the first application, from displaying the second page of the second document in the display window to displaying the first page of the first document in the display window in response to detecting selection of the icon for the first page of the first document.

8. The method of claim 1, further comprising:
displaying, through the first application, a file field while displaying the first page of the first document;
detecting, through the first application, a file name entered into the file field; and
identifying the second document based on the file name entered into the file field.

9. The method of claim 1, further comprising:
displaying, through the first application, a page field while displaying the first page of the first document;
detecting, through the first application, a page name entered into the page field; and
retrieving, through the first application, the second page of the second document based on the page name entered into the page field.

10. The method of claim 1, further comprising:
creating, through the first application, an image of the second page of the second document; and
storing, through the first application, the image of the second page of the second document with the first page of the first document in the first document, wherein said displaying the second page of the second document comprises displaying the image of the second page of the second document.

11. The method of claim 1, wherein:
said retrieving the second page of the second document comprises selecting the second page of the second document while displaying the first page of the first document using the first application.

12. The method of claim 1, further comprising:
launching, by the computing device, the first application;
displaying, by the computing device, the first document from the first application;
launching, by the computing device, the second application from the first application; and creating, by the computing device, the second document with the second application launched from the first application.

13. The method of claim 1, wherein said displaying the second page of the second document comprises displaying the second page of the second document without launching the second application.

14. The method of claim 1, wherein the first application is a word processing application and the second application is a slide presentation application.

15. The method of claim 1, further comprising:
selecting, through the first application, the second page of the second document;
retrieving, through the first application, the second page of the second document in response to selecting the second page of the second document;
receiving, through the first application, a second input requesting display of the second page of the second document; and
switching, through the first application, to displaying the second page of the second document in response to the second input.

16. The method of claim 1, wherein storing the second page of the second document in the first document includes adding meta-data to the first page of the first document comprising a link or address to the second page of the second document.

17. The method of claim 1, further comprising:
displaying, by the first application, an edit icon in response to storing the second page of the second document;
launching, by the first application, the second application in response to a selection of the edit icon; and
editing, through the second application, the second page of the second document.

18. An apparatus, comprising:
a computer system configured to:
identify a first document created by a first application in a first format;
identify, from the first application, a second document created by a second application in a second format, wherein the second application is different than the first application;
retrieve, from the first application, the second document in response to identifying the second document;
display the first document from the first application;
receive an input while displaying the first document from the first application;
switch from displaying the first document from the first application to displaying the second document from the first application in response to the input, wherein switching from displaying the first document to displaying the second document comprises switching from displaying a page of the first document to displaying a page of the second document;
display a save icon while displaying the page of the second document; and
save the page of the second document in the first document in response to selection of the save icon.

19. The apparatus of claim 18, wherein the computer system is configured to display the second document from the first application without launching the second application.

20. The apparatus of claim 18, wherein the computer system is configured to save the first document and the second document in a same file.

21. The apparatus of claim 18, wherein the input comprises a keyboard entry.

22. The apparatus of claim 18, wherein the input comprises selection of a toggle icon.

23. The apparatus of claim 18, wherein the computer system is configured to:
open a display window using the first application; and
display the first document in the display window.

24. The apparatus of claim 23, wherein the computer system is configured to:
display an icon for the second document in the display window; and
switch from displaying the first document in the display window to displaying the second document in the display window in response to detecting selection of the icon for the second document.

25. The apparatus of claim 24, wherein the computer system is configured to:
display an icon for the first document in the display window; and
switch from displaying the second document in the display window to displaying the first document in the display window in response to detecting selection of the icon for the first document.

26. The apparatus of claim 18, wherein the computer system is configured to:
display a file entry field while displaying the first document;
detect a file name entered into the file entry field; and
identify the second document based on the file name.

27. The apparatus of claim 18, wherein the computer system is configured to:
display a page field while displaying the page of the first document;
detect a page name for the second document entered into the page field; and
retrieve the page of the second document based on the page name.

28. The apparatus of claim 18, wherein the computer system is configured to create an image of the second document, wherein displaying the second document comprises displaying the image of the second document.

29. The apparatus of claim 28, wherein the computer system is configured to save the image of the second document in a file with the first document.

30. The apparatus of claim 18, wherein the computer system is configured to:
launch the second application from the first application while displaying the first document; and
create the second document with the second application.

31. The apparatus of claim 18, wherein the computer system is configured to switch from displaying the second document to re-displaying the first document from the first application in response to an additional input.

32. The apparatus of claim 18, wherein the computer system is configured to:
identify pages from the first document;
link the pages from the first document with pages from the second document;
display the pages from the first document; and
switch from displaying the pages from the first document to displaying the pages from the second document in response to the input.

33. The apparatus of claim 32, wherein the computer system is configured to save the pages from the first document and the pages from the second document in a same file.

34. The apparatus of claim 32, wherein the computer system is configured to save images of the pages from the second document in the first document.

35. The apparatus of claim 18, wherein the first application is a word processing application and the second application is a presentation application.

36. The apparatus of claim 18, wherein the computer system is further configured to:
identify, from the first application, a third document created by a third application in a third format;
retrieve, from the first application, the third document in response to identifying the third document;
receive a second input while displaying the first document from the first application;
switch from displaying the first document from the first application to displaying the third document from the first application in response to the input, wherein switching from displaying the first document to displaying the third document comprises switching from displaying a page of the first document to displaying a page of the second document;
display the save icon while displaying the page of the third document; and
save the page of the third document in the first document in response to the selection of the save icon while the third document is displayed.

37. The apparatus of claim 18, wherein the first document is in a text format and wherein the second document is in a video clip format.

38. A computer-readable memory device having instructions stored thereon that, in response to execution by a processing device, cause the processing device to perform procedures, comprising:
identifying, by a first application program, a first page from a first document the first application program in a first format;
identifying, by the first application program, a second page from a second document created by a second application program in a second format, wherein the second application program is different from the first application program;
retrieving, by the first application program, the second page from the second document in response to identifying the second page from the second document;
displaying, by the first application program, the first page from the first document;
receiving, by the first application program, a request to display the second page from the second document while displaying the first page from the first document;
switching, by the first application program, from displaying the first page from the first document to displaying the second page from the second document in response to the request;
displaying a save icon while displaying the second page of the second document; and
saving the second page of the second document in the first document in response to selection of the save icon.

39. The computer-readable memory device of claim 38, wherein the first document is in a first format and the second document is in a second format different than the first format.

40. The computer-readable memory device of claim 38, further comprising instructions, that when executed, result in saving, by the first application program, the first page from the first document and the second page from the second document in a same file.

41. The computer-readable memory device of claim 38, wherein the request comprises a keyboard entry.

42. The computer-readable memory device of claim 38, further comprising instructions, that when executed, result in displaying an icon, by the first application program, wherein the request comprises selection of the icon.

43. The computer-readable memory device of claim 38, further comprising instructions, that when executed, result in switching, by the first application program, from displaying the second page from the second document to displaying the first page from the first document in response to an additional input.

44. The computer-readable memory device of claim 38, further comprising instructions, that when executed, result in:
opening a display window using the first application program; and
displaying the first page from the first document in the display window using the first application program.

45. The computer-readable memory device of claim 44, further comprising instructions, that when executed, result in:
displaying an icon for the second page from the second document in the display window while displaying the first page from the first document; and
switching from displaying the first page from the first document in the display window to displaying the second page from the second document in the display window in response to the selection of the icon for the second page from the second document.

46. The computer-readable memory device of claim 45, further comprising instructions, that when executed, result in:
displaying an icon for the first page from the first document in the display window while displaying the second page from the second document; and
switching from displaying the second page from the second document in the display window to displaying the first page from the first document in the display window in response to selection of the icon for the first page from the first document.

47. The computer-readable memory device of claim 38, further comprising instructions, that when executed, result in:
displaying a file field while displaying the first page from the first document;
detecting a file name entered into the file field; and
identifying the second document based on the file name entered into the file field.

48. The computer-readable memory device of claim 38, further comprising instructions, that when executed, result in:
displaying a page field while displaying the first page from the first document;
detecting a page name entered into the page field; and
identifying the second page from the second document based on the page name.

49. The computer-readable memory device of claim 48, further comprising instructions, that when executed, result in:
displaying a save icon; and
storing the second page from the second document in a file for the first page from the first document in response to detecting selection of the save icon.

50. The computer-readable memory device of claim 38, further comprising instructions, that when executed, result in:
creating an image of the second page from the second document; and
storing the image of the second page from the second document in a file with the first page from the first document, wherein displaying the second page from the second document comprises displaying the image of the second page from the second document.

51. The computer-readable memory device of claim 38, wherein the first document is created by the first application program and the second document is independently created by the second application program.

52. The computer-readable memory device of claim 38, further comprising instructions, that when executed, result in:
selecting the second page from the second document while displaying the first page from the first document, wherein the second page from the second document is retrieved in response to the selection.

53. The computer-readable memory device of claim 38, further comprising instructions, that when executed, result in displaying the second page from the second document with the first application program without launching the second application program.

54. The computer-readable memory device of claim 38, further comprising instructions, that when executed, result in:
launching the first application program;
displaying the first document from the first application program;
launching the second application program from the first application program; and
creating the second document from the second application program.

55. The computer-readable memory device of claim 38, wherein the first application program is a word processing application and the second application program is a slide presentation application.

56. The computer-readable memory device of claim 38, wherein the first application program is a word processing application and the second application program is a spreadsheet application.

* * * * *